United States Patent
Auktun et al.

(10) Patent No.: US 9,695,339 B2
(45) Date of Patent: Jul. 4, 2017

(54) ADHESIVE TAPE WITH TEXTILE CARRIER FOR CABLE BANDAGING

(75) Inventors: Inga Auktun, Norderstedt (DE); Michael Siebert, Schenefeld (DE)

(73) Assignee: tesa SE, Norderstedt (DE)

( * ) Notice: Subject to any disclaimer, the term of this patent is extended or adjusted under 35 U.S.C. 154(b) by 0 days.

(21) Appl. No.: 13/546,097

(22) Filed: Jul. 11, 2012

(65) Prior Publication Data
US 2013/0017746 A1    Jan. 17, 2013

(30) Foreign Application Priority Data
Jul. 14, 2011   (DE) .................. 10 2011 079 114

(51) Int. Cl.
C09J 7/04   (2006.01)

(52) U.S. Cl.
CPC ......... C09J 7/048 (2013.01); *C09J 2203/302* (2013.01); *Y10T 442/2738* (2015.04)

(58) Field of Classification Search
CPC .... D06P 1/18; D06P 1/20; C09J 7/048; Y10T 442/2738
USPC ....................... 428/343; 8/639, 640, 641, 643
See application file for complete search history.

(56) References Cited

U.S. PATENT DOCUMENTS

| | | | | |
|---|---|---|---|---|
| 4,402,704 A | * | 9/1983 | Raisin ..................... | C09B 1/343 8/641 |
| 5,399,183 A | * | 3/1995 | Adam .............................. | 8/641 |
| 5,630,851 A | * | 5/1997 | Jordine ............... | C09B 29/0007 8/641 |
| 5,762,653 A | * | 6/1998 | Adam ................... | C09B 67/004 534/797 |
| 5,989,297 A | * | 11/1999 | Reichert ............... | C09B 62/043 8/549 |
| 6,432,529 B1 | | 8/2002 | Harder et al. | |
| 6,936,553 B2 | | 8/2005 | Von Samson-Himmelstjerna | |
| 8,143,524 B2 | | 3/2012 | Wittig et al. | |
| 2002/0102401 A1 | * | 8/2002 | Hanai ........................... | 428/343 |
| 2002/0125037 A1 | | 9/2002 | Kulper et al. | |
| 2004/0152384 A1 | * | 8/2004 | Ommerborn ................. | 442/151 |
| 2005/0272920 A1 | * | 12/2005 | Hihara et al. ................. | 534/653 |
| 2008/0263789 A1 | * | 10/2008 | Clement ............. | C09B 67/0041 8/639 |
| 2011/0070393 A1 | * | 3/2011 | Kopf ......................... | C09J 7/04 442/149 |

FOREIGN PATENT DOCUMENTS

| | | |
|---|---|---|
| CA | 1198888 A1 | 1/1986 |
| CH | 484316 A | 1/1970 |
| CH | 550226 | 6/1974 |

(Continued)

OTHER PUBLICATIONS

German search report for DE 10 2011 079 114.0 dated Apr. 30, 2012.

(Continued)

*Primary Examiner* — Jeremy R Pierce
(74) *Attorney, Agent, or Firm* — Norris McLaughlin & Marcus, P.A.

(57) ABSTRACT

Adhesive tape consisting of a textile carrier and of an adhesive layer applied to at least one side of the carrier, the carrier being colored with a mixture of dyes and/or pigments, characterized in that at least one of the dyes and/or one of the pigments is based on anthraquinone.

6 Claims, 3 Drawing Sheets

(56) References Cited

FOREIGN PATENT DOCUMENTS

| | | |
|---|---|---|
| CN | 100371395 C | 9/2005 |
| CN | 102020945 A | 4/2011 |
| DE | 2210258 A1 | 9/1973 |
| DE | 2317947 A1 | 11/1973 |
| DE | 4313008 C1 | 11/1994 |
| DE | 19623411 A1 | 12/1997 |
| DE | 19807752 A1 | 8/1999 |
| DE | 10011788 A1 | 3/2002 |
| DE | 10229527 A1 | 1/2004 |
| DE | 10329997 A1 | 1/2005 |
| EP | 0071212 B1 | 2/1983 |
| EP | 0109029 B1 | 9/1986 |
| EP | 0578151 A1 | 1/1994 |
| EP | 1300452 A2 | 4/2003 |
| EP | 1367608 A2 | 12/2003 |
| EP | 1607459 B1 | 12/2005 |
| GB | 1404597 A | 9/1975 |
| GB | 1417512 A | 12/1975 |
| WO | 0201155 A1 | 2/2002 |
| WO | 0218509 A1 | 3/2002 |
| WO | 03033611 A1 | 4/2003 |
| WO | 2004/018567 A1 | 3/2004 |
| WO | 2006108871 A1 | 10/2006 |

OTHER PUBLICATIONS

Ford Engineering Specification, prepared by T. Downey, et al., May 1992.
English-language translation of Chinese Office Action for corresponding CN Application No. 201210245595.8 dated Feb. 17, 2015.

\* cited by examiner

ADHESIVE TAPE WITH TEXTILE CARRIER FOR CABLE BANDAGING

PRIORITY CLAIM

This application claims priority to the German application DE 10 2011 079 114.0 filed Jul. 14, 2011.

BACKGROUND OF THE INVENTION

1. Field of the Invention

The invention relates to an adhesive tape preferably for wrapping elongate product such as more particularly leads or cable looms, having a textile carrier and having a preferably pressure-sensitive adhesive coating applied at least to one side of the carrier. The invention further relates to the use of the adhesive tape and also to an elongate product such as a cable harness which is jacketed with the adhesive tape of the invention, and to the textile carrier itself.

2. Description of Related Art

Adhesive tapes have long been used in the industry for producing cable harnesses. In this utility, the adhesive tapes serve to bundle a multiplicity of electrical leads prior to installation or in the as-installed state, in order to reduce, by bandaging, the space taken up by the bundle of leads, and also, in addition, to obtain protective functions.

Also in use are jackets which consist of a covering, the self-adhesively treated adhesive tape being present at least in an edge region of the covering and being bonded to the covering in such a way that the adhesive tape extends over one of the longitudinal edges of the covering, preferably in an edge region which is narrow in comparison to the width of the covering. A product of this kind, and also optimized embodiments thereof, is disclosed in EP 1 312 097 A1. These jackets are known to the skilled person by the designation of "sleeves".

The carriers of these adhesive tapes/sleeves are mostly textile and consist predominantly of PET. Used typically for this purpose as carriers is woven or nonwoven PET fabric which has been coloured black.

In the wake of the increasing introduction of hybrid cars, the adhesive tapes/sleeves are now required additionally to fulfil a warning function: all cables or cable bundles with voltages greater than 60 V must be marked by an orange shade. In the course of the year 2010, the shade stipulated as the standard shade in this context was RAL 2003 (pastel orange).

To date there have been no solutions for orange adhesive tapes/sleeves which exhibit no significant colour fade after a test duration of 3000 hours even at temperatures of 125° C. or 150° C.

One possible consequence of this in practice is that a fire-fighter, confronted with an older car that has been involved in an accident, may not be protected by a bright orange warning signal from cables which are carrying high voltages.

The testing and classifying of adhesive tapes for cable jacketing take place in the motor vehicle industry in accordance with extensive bodies of standards, such as, for example, LV 312-1 "Protection systems for wire harnesses in motor vehicles, adhesive tapes; test guideline" (October 2009), as a joint standard of the companies Daimler, Audi, BMW and Volkswagen, or the Ford specification ES-XU5T-1A303-aa (revised version March 2011) "Harness Tape Performance Specification". In the text below, these standards are referred to in abbreviated form as LV 312 and Ford specification, respectively.

The influence of elevated temperature over prolonged time periods must not cause adhesive tapes/sleeves to decolour, bleach or fade. Furthermore, the cable insulation must not undergo alteration, let alone damage, by the influence of the adhesive tape in combination with elevated temperature over prolonged time periods—compatibility with the core insulation is a must. The core insulation must not exhibit any discoloration, cracking or other damage.

LV 312 here distinguishes between four temperature classes, T1 to T4, corresponding to 85° C. (also called temperature class A), 105° C. (also called temperature class B (105)), 125° C. (also called temperature class C) and 150° C. (also called temperature class D), which the wrapped cables are required to withstand for 3000 hours. It is obvious that temperature classes T3 and T4 impose more exacting requirements on the adhesive tape than the lower classes T1 and T2. Classification as T1 to T4 is determined both by the cable insulation material and also by the pressure-sensitive adhesive and type of carrier.

EP 1 607 459 B1 discloses the spin dyeing of PET textile carriers. The textile carrier consists of spundyed threads or fibres. In spin dyeing, a polymer used for producing fibres is initially melted. To produce a spinning dope, additives such as antioxidants and colour pigments are added to the polymer melt. The spinning dope which is used for producing the fibres is coloured directly. The dope is subsequently spun by means of an extruder and further processed to form yarns or staple fibres. It is preferred in that patent if, by using spundyed yarns or fibres as carrier material of the adhesive tape, the dye is already incorporated into the polymeric matrix in the course of the operation of producing the fibres themselves, in such a way that there can be no decolouring of the textile material or any dye migration later in the course of storage or exposure of the adhesive tape at elevated temperatures.

However, the assertions made in this patent application apply in general only to black dyeing, since the black colour particles in question have no tendency to fade at high temperatures.

In the case of spundyed and stabilized fibres, fading occurs as a result of temperature exposure, through degeneration of the colour pigment/dye, if orange-coloured particles (for example, as pure orange or as a mixture of red, yellow and pure orange) are used. Furthermore, in view of the high cost and complexity involved in equipping for spin dyeing for a single colour, very high batch sizes must be manufactured in order to obtain a cost-effective operation.

Currently available on the market, then, are tesa® 51026 orange (piece-dyed, light) and tesa® 51026 orange (spundyed, dark). The carriers of both products contain standard orange pigments with azo compounds, and their tendency to decolour under temperature exposure is such that they attain the temperature class only of T2 (105° C. for 3000 hours). By comparison of temperature storage results on the one hand only for the carrier and on the other hand for the carrier coated with adhesive and bonded to aluminium, it is possible to ascertain, for both forms of colouring, that in terms both of fading and of migration there is no difference in temperature stability above T2.

It is an object of the invention to obtain a marked improvement over the prior art and to provide an adhesive tape with a coloured textile carrier, and also to provide a coloured textile carrier, which have no tendency to fade even on elevated temperature exposure.

SUMMARY OF THE INVENTION

This object is achieved by means of an adhesive tape as characterized in more detail hereinbelow. Additionally embraced by the concept of the invention are the use of the tape of the invention and also a cable harness jacketed with the tape. Additionally part of the concept of the invention is a textile carrier.

The invention accordingly provides an adhesive tape consisting of a textile carrier and of an adhesive layer applied to at least one side of the carrier, the carrier being coloured with a mixture of dyes and/or pigments, where at least one of the dyes and/or one of the pigments is based on anthraquinone.

BRIEF DESCRIPTION OF THE DRAWINGS

The invention will now be described in greater detail with reference to the drawings, wherein.

DETAILED DESCRIPTION OF THE INVENTION

If reference is made below only to dyes or to pigments, it is obvious to the skilled person that both are meant.

Dyes referred to as anthraquinone dyes are an extensive group of highly lightfast dyes with a variety of kinds of constitution, being derived from anthraquinone by substitution or by fused attachment of further ring systems (for example acridones, carbazoles, thiazoles, thiophene derivatives, azines, fused ring systems and the like).

Anthraquinone pigments are a class of pigments which derive from the parent structure of anthraquinone. They include aminoanthraquinone pigments and hydroxyanthraquinone pigments, and also heterocyclic and polycarbocylic anthraquinone pigments.

The heterocyclic anthraquinone pigments derive formally from aminoanthraquinone. They include anthrapyrimidine pigments, indanthrone pigments and flavanthrone pigments. Polycarbocyclic anthraquinone pigments are more highly fused, carbocyclic quinones whose simplest parent structure is the anthraquinone. Specifically, they are pyranthrone pigments, anthanthrone pigments and isoviolanthrone pigments.

In accordance with one preferred embodiment, the mixture consists of yellow and red dyes and/or pigments.

With further preference, the yellow dye and/or the yellow pigment are based on anthraquinone, and the red dye and/or the red pigment consist of an azo compound.

All azo dyes have the general formula R1—N═N—R2, where the two radicals R1 and R2 may be identical or different.

Where the dye molecule contains two azo groups, the product is a diazo dye; with three azo groups, it is a trisazo dye, and so on.

The multiplicity of the azo dyes is attributable to introduction of alkoxy, carboxyl, sulpho, nitro, alkyl and aryl groups, halogens and other substituents into the arylazo nuclei. The aromatic nucleus here consists not only of benzene derivatives, but also of naphthalene derivatives, anthracene derivatives and also heterocyclic derivatives.

The red dye and/or the red pigment may further comprise a mixture of anthraquinone compounds and azo compounds.

As textile carriers it is possible to use all known textile carriers such as knitted fabrics, scrims, tapes, braids, tufted textiles, felts, woven fabrics (encompassing plain weave, twill and satin weave), knitted fabrics (encompassing warp knits and other knits) or nonwoven webs, the term "nonwoven web" comprehending at least sheetlike textile structures in accordance with EN 29092 (1988) and also stitchbonded webs and similar systems.

It is likewise possible to use woven and knitted spacer fabrics with lamination. Spacer fabrics of these kinds are disclosed in EP 0 071 212 B1. Spacer fabrics are mat-like layer structures comprising a cover layer of a fibre or filament web, an underlayer and individual retaining fibres or bundles of such fibres between these layers, these fibres being distributed over the area of the layer structure, being needled through the particle layer and joining the cover layer and the underlayer to one another. As an additional although not mandatory feature, the retaining fibres in accordance with EP 0 071 212 B1 contain particles of inert minerals, such as sand, gravel or the like, for example.

The retaining fibres needled through the particle layer hold the cover layer and the underlayer at a distance from one another and are joined to the cover layer and the underlayer.

Nonwovens contemplated include, in particular, consolidated staple fibre webs, but also filament webs, meltblown webs and spunbonded webs, which generally require additional consolidation. Possible consolidation methods known for webs include mechanical, thermal and chemical consolidation. Whereas with mechanical consolidations the fibres are held together purely mechanically usually by entanglement of the individual fibres, by the interlooping of fibre bundles or by the stitching-in of additional threads, it is possible by thermal and by chemical techniques to obtain adhesive (with binder) or cohesive (binderless) fibre-fibre bonds. Given appropriate formulation and an appropriate process regime, these bonds may be restricted exclusively, or at least predominantly, to fibre nodal points, so that a stable, three-dimensional network is formed while nevertheless retaining the relatively loose, open structure in the web.

Webs which have proved to be particularly advantageous are those consolidated in particular by overstitching with separate threads or by interlooping.

Consolidated webs of this kind are produced for example on stitchbonding machines of the "Malimo" type from the company Karl Mayer, formerly Malimo, and can be obtained from companies including Techtex GmbH. A Malifleece is characterized in that a cross-laid web is consolidated by the formation of loops from fibres of the web.

The carrier used may also be a web of the Kunit or Multiknit type. A Kunit web is characterized in that it originates from the processing of a longitudinally oriented fibre web to form a sheetlike structure which has loops on one side and has loop feet or pile fibre folds on the other side, but possesses neither threads nor prefabricated sheetlike structures. A web of this kind as well has been produced for a relatively long time, for example on stitchbonding machines of the "Malimo" type from the company Karl Mayer. A further characterizing feature of this web is that, as a longitudinal-fibre web, it is able to absorb high tensile forces in the longitudinal direction. The characteristic feature of a Multiknit web relative to the Kunit web is that the web is consolidated on both the top and bottom sides by virtue of the double-sided needle punching. The starting product used for a Multiknit is generally one or two single-sidedely interlooped pile fibre nonwovens produced by the Kunit process. In the end product, both top sides of the nonwovens are shaped by means of interlooped fibres to form a closed surface, and are joined to one another by fibres which stand almost perpendicularly. An additional possibility is to introduce further needlable sheetlike structures and/or scatterable media.

Finally, stitchbonded webs as an intermediate are also suitable for forming a liner of the invention and an adhesive tape of the invention. A stitchbonded web is formed from a nonwoven material having a large number of stitches extending parallel to one another. These stitches are brought about by the stitching-in or stitchbonding of continuous textile threads. For this type of web, stitchbonding machines of the "Malimo" type from the company Karl Mayer, formerly Malimo, are known.

Also particularly suitable are needlefelt webs. In a needlefelt web, a tuft of fibres is made into a sheetlike structure by means of needles provided with barbs. By alternate introduction and withdrawal of the needles, the material is consolidated on a needle bar, with the individual fibres interlooping to form a firm sheetlike structure. The number and configuration of the needling points (needle shape, penetration depth, double-sided needling) determine the thickness and strength of the fibre structures, which are in general lightweight, air-permeable and elastic.

Also particularly advantageous is a staple fibre web which is mechanically preconsolidated in the first step or is a wet-laid web laid hydrodynamically, in which between 2% and 50% by weight of the web fibres are fusible fibres, more particularly between 5% and 40% by weight of the web fibres.

A web of this kind is characterized in that the fibres are laid wet or, for example, a staple fibre web is preconsolidated by the formation of loops from fibres of the web by needling, stitching or air-jet and/or water-jet treatment.

In a second step, thermofixing takes place, with the strength of the web being increased again by the melting, or partial melting, of the fusible fibres.

For the utilization of nonwovens in accordance with the invention, the adhesive consolidation of mechanically preconsolidated or wet-laid webs is of particular interest, it being possible for said consolidation to take place by way of the addition of binder in solid, liquid, foamed or paste-like form. A great diversity of theoretical presentation forms is possible: for example, solid binders as powders for trickling in; as a sheet or as a mesh; or in the form of binding fibres. Liquid binders may be applied as solutions in water or organic solvents, or as a dispersion. For adhesive consolidation, binding dispersions are predominantly selected: thermosets in the form of phenolic or melamine resin dispersions, elastomers as dispersions of natural or synthetic rubbers or, usually, dispersions of thermoplastics such as acrylates, vinyl acetates, polyurethanes, styrene-butadiene systems, PVC, and the like, and also copolymers thereof. Normally the dispersions are anionically or nonionically stabilized, although in certain cases cationic dispersions may also be of advantage.

The binder may be applied in a manner which is in accordance with the prior art and for which it is possible to consult, for example, standard works of coating or of nonwoven technology such as "Vliesstoffe" (Georg Thieme Verlag, Stuttgart, 1982) or "Textiltechnik-Vliesstofferzeugung" (Arbeitgeberkreis Gesamttextil, Eschborn, 1996).

For mechanically preconsolidated webs which already possess sufficient composite strength, the single-sided spray application of a binder is appropriate for producing specific changes in the surface properties.

Such a procedure not only is sparing in its use of binder but also greatly reduces the energy requirement for drying. Since no squeeze rolls are required and the dispersions remain predominantly in the upper region of the nonwoven, unwanted hardening and stiffening of the web can be largely prevented.

For sufficient adhesive consolidation of the web carrier, the addition of binder in the order of magnitude of 1% to 50%, more particularly 3% to 20%, based on the weight of the fibre web, is generally required.

The binder may be added as early as during the manufacture of the web, in the course of mechanical preconsolidation, or else in a separate process step, which may be carried out in-line or off-line. Following the addition of binder, it is necessary temporarily to generate a condition for the binder in which the binder becomes adhesive and adhesively connects the fibres—this may be achieved during the drying, for example, of dispersions, or else by means of heating, with further possibilities for variation existing by way of areal or partial application of pressure. The binder may be activated in known drying tunnels, given an appropriate selection of binder, or else by means of infra-red radiation, UV radiation, ultra-sound, high-frequency radiation or the like. For the subsequent end use it is sensible, though not absolutely necessary, for the binder to have lost its tack following the end of the web production process. It is advantageous that, as a result of thermal treatment, volatile components such as fibre assistants are removed, giving a web having favourable fogging values, so that when a low-fogging adhesive is used, it is possible to produce an adhesive tape having particularly favourable fogging values; accordingly, the enclosure as well has a very low fogging value.

A further special form of adhesive consolidation involves activating the binder by partial dissolution or partial swelling. In this case it is also possible in principle for the fibres themselves, or admixed specialty fibres, to take over the function of the binder. Since, however, such solvents are objectionable on environmental grounds, and/or are problematic in their handling, for the majority of polymeric fibres, this process is not often employed.

Advantageously and at least in regions, the carrier has a single-sidedly or double-sidedly polished surface, preferably in each case a surface polished over the whole area. The polished surface may be chintzed, as elucidated in detail in EP 1 448 744 A1, for example.

Starting materials for the textile carrier are more particularly (manmade) fibres (staple fibre or continuous filament) made from synthetic polymers, also called synthetic fibres, made from polyester, polyamide, polyimide, aramid, polyolefin, polyacrylonitrile or glass, (manmade) fibres made from natural polymers such as cellulosic fibres (viscose, Modal, Lyocell, Cupro, acetate, triacetate, Cellulon), such as rubber fibres, such as plant protein fibres and/or such as animal protein fibres and/or natural fibres made of cotton, sisal, flax, silk, hemp, linen, coconut or wool. The present invention, however, is not confined to the materials stated; it is instead possible, as evident to the skilled person without having to take an inventive step, to use a multiplicity of further fibres in order to produce the textile carrier.

Likewise suitable, furthermore, are yarns fabricated from the fibres specified. Staple fibres are individual fibres which are limited in their length. The opposite of staple fibres are filaments (continuous fibres). All natural fibres are staple fibres, since they occur only up to a certain length. All manmade fibres can be cut to form staple fibres. In the text below, the staple fibres are also referred to, for simplification, as just fibres.

In the case of woven fabrics or scrims, individual threads may be produced from a blend yarn, and thus may have synthetic and natural constituents. Generally speaking, however, the warp threads and the weft threads are each formed of a single kind.

The warp threads and/or the weft threads here may in each case be composed only of synthetic threads or only of threads made from natural raw materials.

The textile carrier consists preferably of a nonwoven web made of staple fibres and/or filaments. It is further preferred if the textile carrier is a woven fabric.

The textile carrier consists preferably of fibres, filaments or threads made from polyester fibres, polypropylene fibres, polyethylene fibres or polyamide fibres, more particularly from polyester.

The polyester fibres are based preferably on polyethylene terephthalate (PET) or polylactic acid (PLA).

One particularly preferred embodiment comprises a nonwoven-web-based or woven-fabric-based textile carrier which consists, furthermore, of polyester fibres, polyester filaments or polyester threads.

The fibre thickness is preferably 1 to 5 dtex (1 tex: 1 gram per 1000 meters), more preferably 1.7 to 3.6 dtex.

The fibre length is preferably 50 to 100 mm, more preferably 60 to 85 mm.

In accordance with one further preferred embodiment of the invention, the basis weight of the textile carrier is between 30 g/m$^2$ and 180 g/m$^2$.

In accordance with another preferred embodiment of the invention, the fibres, filaments or threads of the textile carrier are dyed by disperse dyeing. This disperse dyeing is carried out using synthetic dyes which are of sparing solubility or virtual insolubility in water. Since dyeing also takes place from an aqueous solution, the colorants are very finely ground down and introduced together with dispersants into a dyebath which is heated at about 100° C. The molecularly dispersed dye particles therein come out of the liquor and then diffuse into the fibre, where they dissolve and enter into a firm bond.

The fibres, filaments or threads of the textile carrier are preferably penetrated completely by the dyes and/or pigments.

With further preference, in order to improve the dyeing operation, an auxiliary is used which improves penetration with the dye, an example being Albaflow Uni-01 from Huntsman.

At the same time it is possible to use auxiliaries which lead to an even dyeing, examples being levelling agents such as Univadine Top from Huntsman.

Levelling agents promote the penetration of the dyebath in the textile, improve the uniform attachment and prevent imbalances in colour levels. Important chemical components are, for example, ethoxylated fatty amines or fatty alcohols, sulphonated oils, carboxylic esters and quaternized ammonium compounds.

With further preference, use is made additionally of auxiliaries which increase the UV stability, especially as this leads at the same time to an increase in the temperature stability.

One problem in the case of adhesive tapes wound into a roll may be the possible migration of the pigments from the fibre into the adhesive.

In order to prevent temperature-induced decolouring as a result of dye/pigment migration during storage in accordance with the LV-312 and Ford specifications, the temperature during dyeing ought to be at least 135° C. for 60 minutes, preferably 135° C. for 90 minutes.

In order to suppress migration of the dyes from the PET (polyester) threads, filaments or fibres that are preferably used, it is advisable to remove the dyeing auxiliaries used from the carrier by clearing operations. In just the same way as these agents, at temperature during the dyeing operation, lead to better penetration of the fibres, they may—if they still remain on the carrier in the end application—lead at temperature to accelerated decolouring of the fibres. The reductive clearing ought to be carried out at a temperature of at least 70° C. For the clearing it is preferred to use an afterclearing agent for disperse dyeings that has affinity for disperse dyes. This agent is, in particular, Eriopon OS (from Huntsman).

Clearing agents of this kind remove the residues of dye that have merely been deposited superficially, or the clearing agent interacts with the dyes accumulated on the fibres. This activity is provided by anionic and cationic polymers with different degrees of polymerization and different chemistries.

To convert the carrier into an adhesive tape, any known adhesive system can be employed. In addition to natural or synthetic rubber-based adhesives it is possible more particularly to use silicone adhesives and also polyacrylate adhesives, preferably a low molecular weight acrylate pressure-sensitive hotmelt adhesive. On account of their particular usefulness as adhesives for wrapping tapes for automotive cable looms in respect of the absence of fogging and also the outstanding compatibility with both PVC and PVC-free core insulations, solvent-free acrylate hotmelt compositions as more particularly described in DE 198 07 752 A1 and also DE 100 11 788 A1 are preferable.

The add-on weight is preferably in the range between 15 to 200 g/m$^2$, more preferably in the range from 30 to 120 g/m$^2$ (roughly corresponding to a thickness of 15 to 200 µm and more preferably of 30 to 120 µm).

The adhesive is preferably a pressure-sensitive adhesive, i.e. an adhesive which provides a durable bond to almost all substrates under relatively light pressure and can be redetached from the substrate after use essentially without leaving a residue. A pressure-sensitive adhesive is permanently tacky at room temperature, i.e. has a sufficiently low viscosity and a high initial tack, so that it will wet the surface of the particular substrate under minimal pressure. The adherability of the adhesive material rests on its adhesive properties and the redetachability on its cohesive properties.

One suitable adhesive is based on an acrylate hotmelt with a K value of at least 20 and more particularly greater than 30 (measured in each case in 1% strength by weight solution in toluene, 25° C.), obtainable by concentrating a solution of such a composition to give a system which can be processed as a hot melt.

The K value (in accordance with FIKENTSCHER) is a measure of the average molecular size of high polymers. The viscosity of polymers is determined using a capillary viscometer in accordance with DIN EN ISO 1628-1:2009.

The measurement is carried out by preparing one-percent (1 g/100 ml) polymer solutions in toluene at 25° C. and measuring these using the corresponding DIN Ubbelohde viscometer according to ISO 3105:1994, Table B.9.

The concentrating can take place in appropriately equipped tanks or extruders; particularly in the case of the attendant devolatilization the preference is for a devolatilizing extruder.

An adhesive of this type is set forth in DE 43 13 008 C2. In an intermediate step, the solvent is completely removed from these acrylate compositions prepared in this way.

In addition, further volatile constituents are removed in the process. After coating from the melt, these compositions have only small residual fractions of volatile constituents. Accordingly it is possible to adopt all the monomers/recipes that are claimed in the patent cited above.

The solution of the composition can contain 5% to 80% by weight and more particularly 30% to 70% by weight of solvent.

Commercially available solvents are preferred, more particularly low-boiling hydrocarbons, ketones, alcohols and/or esters.

Preference is further given to single-screw, twin-screw or multi-screw extruders having one or, more particularly, two or more devolatilizing units.

The acrylate hotmelt-based adhesive may have had benzoin derivatives incorporated into it by copolymerization— for example benzoin acrylate or benzoin methacrylate, acrylic or methacrylic esters. Such benzoin derivatives are described in EP 0 578 151 A.

The acrylate hotmelt-based adhesive may be UV-crosslinked. Other types of crosslinking are also possible, however, electron-beam crosslinking being one example.

In a further preferred embodiment, self-adhesive compositions are used comprising copolymers of (meth)acrylic acid and esters thereof having 1 to 25 C atoms, maleic, fumaric and/or itaconic acid and/or esters thereof, substituted (meth)acrylamides, maleic anhydride and other vinyl compounds, such as vinyl esters, especially vinyl acetate, vinyl alcohols and/or vinyl ethers.

The residual solvent content should be below 1% by weight.

One adhesive which is found to be particularly suitable is an acrylate pressure-sensitive hotmelt adhesive of the kind marketed by BASF under the name acResin, especially acResin A 260 UV. This adhesive, which has a low K value, acquires its use-appropriate properties via a final radiation-induced crosslinking operation.

The coloured PET carrier is preferably coated with an acrylate-based adhesive (temperature class T4) or with an SIS-based adhesive (temperature class T3).

The adhesive may be applied in the longitudinal direction of the adhesive tape, in the form of a stripe having a width less than that of the adhesive tape carrier.

In one advantageous embodiment, the coated stripe has a width of 10% to 80% of the width of the carrier material. The use of stripes having a coating of 20% to 50% of the width of the carrier material is particularly preferable.

Depending on the use scenario it is also possible for two or more parallel stripes of adhesive to be coated on the carrier material.

The position of the stripe of the carrier is freely selectable, with a disposition directly at one of the edges of the carrier being preferred.

The adhesives can be prepared and processed from solution, from dispersion and also from the melt. Preferred production and processing processes take place from solution and also from the melt. Particular preference is given to fabricating the adhesive from the melt, in which case it is more particularly possible to use batch processes or continuous processes. The continuous fabrication of pressure-sensitive adhesives using an extruder is particularly advantageous.

The adhesives thus prepared can then be applied to the carrier using the generally known processes. In the case of processing from the melt, these can be application processes via a nozzle or a calender.

In the case of processes from solution, coatings with rods, blades or nozzles are known, to name but a few.

It is also possible to transfer the adhesive from a non-stick backing cloth or release liner onto the carrier assembly.

Finally, the adhesive tape may include a covering material to line the one or two adhesive layers until use. Useful covering materials also include any of the materials recited at length above.

Preference, however, is given to a non-linting material such as a polymeric film or a highly sized long-fibred paper.

When low flammability is desired for the adhesive tape described, flame retardants can be added to the carrier and/or the adhesive. They can be organobromine compounds, if necessary together with synergists such as antimony trioxide, although with an eye to the absence of halogen from the adhesive tape, preference will be given to using red phosphorus, organophosphorus compounds, mineral or intumescent compounds such as ammonium polyphosphate, alone or combined with synergists.

The general expression "adhesive tape" for the purpose of this invention encompasses all sheetlike structures such as two-dimensionally extended films or film portions, tapes of extended length and limited width, tape portions and the like, and lastly also diecuts or labels.

The adhesive tape may be produced not only in the form of a roll, i.e. wound up on itself in the form of an Archimedean spiral, but also lined on the adhesive side with release materials such as siliconized paper or siliconized film.

The reverse face of the adhesive tape may be coated with a reverse-face lacquer in order that a favourable influence may be exerted on the unwind properties of the adhesive tape wound to an Archimedean spiral. For this purpose, this reverse-face lacquer may be coated with silicone or fluorosilicone compounds and also with polyvinylstearylcarbamate, polyethyleneiminestearylcarbamide or organofluorine compounds as adhesive substances. Optionally under the reverse-face lacquer or alternatively thereto, a foam coating is positioned on the reverse face of the adhesive tape.

In accordance with the invention, the single-sidedly adhesive version of the adhesive tape is preferred.

The adhesive tape is preferably used for jacketing elongate product such as more particularly cable looms, the elongate product being enveloped by the adhesive tape in an axial direction, or the adhesive tape being passed in a helical spiral around the elongate product.

Finally, the concept of the invention also embraces an elongate product jacketed with an adhesive tape of the present invention. The elongate product is preferably a cable loom.

Owing to the outstanding suitability of the adhesive tape, it can be used in a jacketing which consists of an enclosure where the self-adhesive tape is present in an edge region of the covering at least and is adhered on the enclosure such that the adhesive tape extends beyond one of the longitudinal edges of the enclosure, preferably in a narrow edge region compared with the width of the enclosure.

Such a product and also optimized embodiments thereof are disclosed in EP 1 312 097 A1. EP 1 300 452 A2, DE 102 29 527 A1 and also WO 2006 108 871 A1 set forth further developments for which the adhesive tape of the invention is likewise very highly suitable. The adhesive tape of the invention can similarly be used in a process as disclosed in EP 1 367 608 A2.

Finally, EP 1 315 781 A1 and also DE 103 29 994 A1 describe embodiments of adhesive tapes as are also possible for the adhesive tape of the invention.

With a product of this kind, the enclosure, which is not furnished with adhesive, is produced, particularly preferably, from a coloured textile carrier.

Furthermore, the invention also includes a textile carrier which is coloured with a mixture of dyes and/or pigments, where at least one of the dyes and/or one of the pigments is based on anthraquinone.

This textile carrier may have all of the advantageous properties as described in this disclosure for the carrier which according to the invention is used as an adhesive tape carrier.

The adhesive tape of the invention (or the coloured textile carrier) offers numerous advantages which could not have been foreseen as such.

Where an acrylate is used as the adhesive, it is possible for the first time to provide an adhesive tape having a coloured carrier for the jacketing of cable bundles that fulfils temperature class T4 in accordance with the Ford specification. In the case of other adhesives, such as SIS, the temperature class T3 is still fulfilled, without instances of discoloration being observed.

Surprisingly it has emerged that with the product construction proposed, there is no significant difference in temperature decolouring between uncoated and adhesive-coated carrier, and the temperature stability exceeds that of a spundyed carrier with standard pigments.

In order to achieve high colour stability, it is not necessary to carry out spin dyeing (in other words an ensured complete penetration of the fibres) with its above-outlined disadvantages. In comparison to spin dyeing, a cost-effective manufacturing of small quantities by means of piece dyeing (for example of the woven-fabric carrier) is possible.

The adhesive tape will now be more particularly elucidated using several figures without any intention thereby to cause any kind of restriction.

Figure 1:
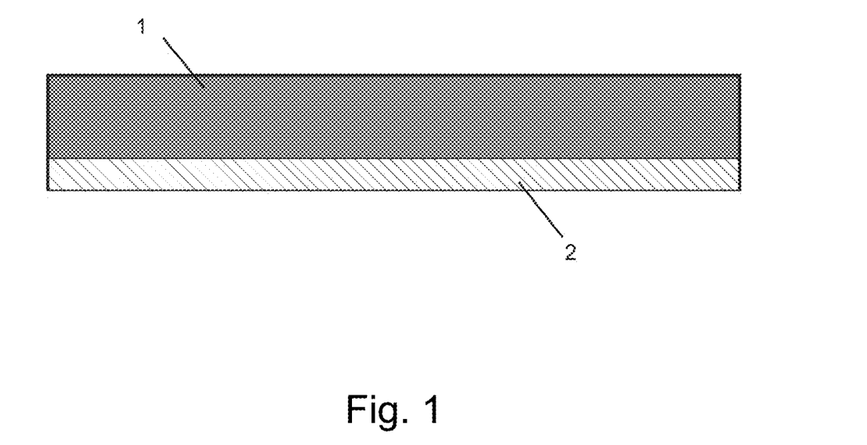
FIG. 1 shows the adhesive tape in lateral section.

FIG. 1 shows a section in cross section (cross section) of the adhesive tape which consists of a woven fabric 1 coated on one side with a layer of a self-adhesive coating 2. The woven fabric 1 is a fabric woven from polyester threads which are coloured orange with an anthraquinone-based dye, thus giving the carrier the shade of "RAL 2003 orange". The carrier bears an applied coating of acrylate adhesive 2 (acResin) at 90 g/m$^2$.

Figure 2:
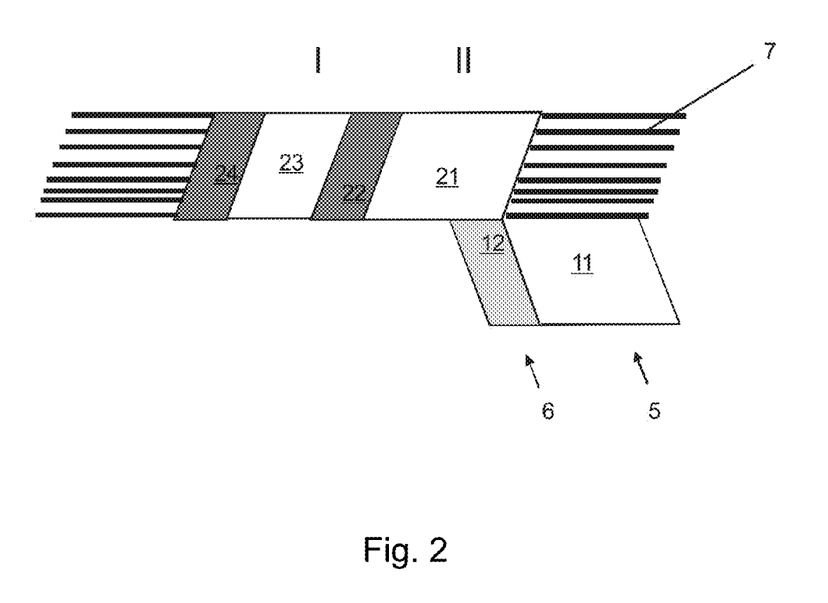
FIG. 2 shows a detail of a cable harness composed of a bundling of individual cables and jacketed with the adhesive tape of the invention.

FIG. 2 shows a detail of a cable harness which is composed of a bundling of individual cables 7 and which is jacketed with the adhesive tape of the invention. The adhesive tape is spiralled around the cable harness.

The cable harness detail shown shows two windings I and II of the adhesive tape. Further windings would extend towards the left; they are not depicted here.

A stripe 5 of the enclosure is present on the adhesive coating to produce an adhesive stripe 6 extending in the longitudinal direction of the tape. Non-adhesive regions 11, 21, 23 of the adhesive tape alternate with adhesive regions 12, 22, 24. (The portions 22, 24 are—unlike the exposed adhesive material 12—not visible from the outside, hence the choice of denser hatching for the depiction.)

The cable harness is jacketed such that the adhesive stripe 6 completely adheres on the adhesive tape. Adhering to the cables 7 is excluded.

Figure 3:
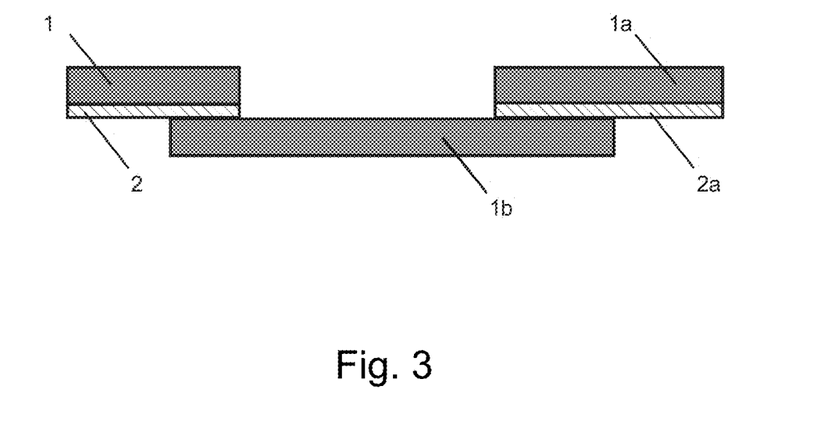
FIG. 3 and FIG. 4 show the use of the adhesive tape of FIG. 1 or the textile carrier of the invention in a sleeve construction.

FIG. 3 shows a covering 1b made from a woven-fabric-based textile carrier which has been coloured orange in accordance with the invention. Two adhesive tapes are applied to the top face of the covering 1b, in each case in the edge region, in such a way that the adhesive tapes overlap the edge of the covering 1b. The adhesive tapes each consist of an orange-coloured woven carrier 1, 1a, to each of which an acrylate adhesive 2, 2a is applied at 90 g/m$^2$. The textile carriers 1, 1a and 1b all have the shade "RAL 2003 orange".

This sleeve version is not guided in a helical-line movement around the product that is to be wrapped (preferably a cable harness), but is instead guided in the form of an Archimedean spiral around the product, thereby wrapping the product in a simple circular motion.

Figure 4:
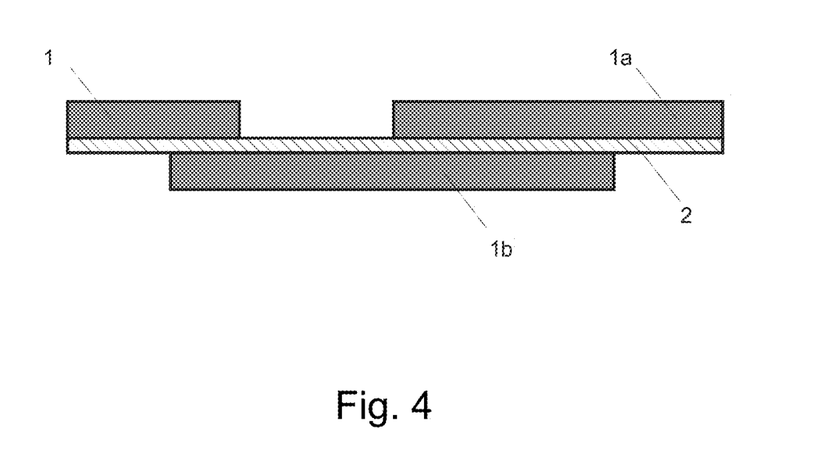

FIG. 4 shows a version of the construction from FIG. 3. This version consists of a covering 1b comprising a woven-fabric-based textile carrier which has been coloured orange in accordance with the invention. Two textile carriers 1, 1a are applied to the top face of the covering 1b, in each case in the edge region, in such a way that the textile carriers overlap the edge of the covering 1b. The carriers each consist of an orange-coloured woven-fabric carrier 1, 1a.

The bottom faces of the woven carriers 1, 1a are furnished over their full area with a layer 2 of acrylate-based adhesive (90 g/m$^2$). This layer 2 of adhesive further extends on the top face of the covering 1b, which is not lined by the textile carriers 1 and 1a, and so a single continuous layer 2 of adhesive is produced.

The textile carriers 1, 1a and 1b all have the shade "RAL 2003 orange". This sleeve version is used in the same way as the one above.

The invention is more particularly elucidated below using examples without any intention thereby to cause any kind of restriction.

Colouring Recipe for all Specimens: (pH 4-5)

0.5 g/L ALBAFLOW UNI-01 (Huntsman), penetration accelerant and deaerating agent, formulation based on non-ionic surfactants 1.0 g/L UNIVADINE TOP (Huntsman), levelling, dispersing and migrating agent, mixture of complex phosphate ester and polyalkylene polyol 2.0 g/L ALBATEX AB-45, acid buffer, mixture of salts and organic acids X % by weight TERATOP dyes Reducing Agents:

4.0 mL NaOH 36° Bé (Bé is degrees Baumé)

2.0 g/L hydrosulphite, concentrated 1.0 g/L ERIOPON OS (Huntsman), afterclearing agent for disperse dyeings with affinity for disperse dyes, preparation based on ethoxylated fatty acid derivatives 20 minutes at 70° C.

Rinse and neutralize with acetic acid

Colouring Operation:

Start at 70 to 80° C.

--> heat at 2° C./min to 135° C.

--> maintain temperature for 45 minutes

--> rinse hot and cold, carry out reduction

The specimens were stored in a forced-air oven in line with the requirements from LV 312 for the various temperature classes, after which they were inspected. A temperature class is considered to have been obtained only when after complete storage there are no visible changes in colour between stored specimen and reference specimen, in a direct comparison by placing the specimens alongside one another, with the naked eye in daylight. A change in colour is, for example, a lightening of the carrier (see also Section 5.2 of LV 312).

Indicated below is the temperature class "attained". figures are % by weight.

Counter-Example 1

X=0.7% TERASIL Orange GL (azo compound)
→Temperature class T2

Counter-Example 2

X=2.7% TERASIL Orange GL (azo compound)
→Temperature class T2

Example 3

X=2.457% TERATOP Yellow HL-RS 200% Orange GL (anthraquinone compound)+0.243% Red HL-R-01 (mixture of azo and anthraquinone compounds)
→Temperature class T3

Example 4

X=2.538% TERATOP Yellow HL-RS 200% Orange GL (anthraquinone compound)+0.162% Red HL-S (azo compound)
→Temperature class T3,
Example 4 shows a much better stability, with T4, than Example 3; with T4, only slight decolouring can be observed.

The invention claimed is:

1. An adhesive tape comprising a textile carrier and an adhesive layer applied to at least one side of the carrier, the carrier being colored orange with a mixture of dyes and/or pigments, wherein the mixture comprises (A) yellow dye and/or yellow pigment and (B) red dye and/or red pigment, and wherein (i) the yellow dye and/or the yellow pigment is an anthraquinone compound; (ii) the red dye and/or the red pigment is an azo compound or a mixture of an anthraquinone compound and an azo compound; and (iii) the orange exhibits color stability of at least temperature class T3 in accordance with LV 312.

2. Adhesive tape according to claim 1, wherein fibers and filaments of the textile carrier are completely penetrated by the dyes and/or pigments.

3. Adhesive tape according to claim 1, wherein the carrier comprises polyester fibers, polypropylene fibers, polyethylene fibers or polyamide fibers.

4. Adhesive tape according to claim 1, wherein the textile carrier has a basis weight of between 30 g/m$^2$ and 180 g/m$^2$.

5. Adhesive tape according to claim 1, wherein the adhesive comprises natural rubber, synthetic rubber, acrylate, or silicone.

6. A textile carrier, which is colored orange with a mixture of yellow and red dyes and/or pigments, wherein (A) at least one of the yellow dyes and/or one of the yellow pigments is an anthraquinone compound; (B) at least one of the red dyes and/or one of the red pigments is an azo compound; and (C) the orange exhibits color stability of at least temperature class T3 in accordance with LV 312.

* * * * *